(12) United States Patent
Liu

(10) Patent No.: US 12,013,835 B2
(45) Date of Patent: Jun. 18, 2024

(54) METHODS, SYSTEMS, AND APPARATUSES FOR IMPROVED QUALITY ASSURANCE

(71) Applicant: McKesson Corpration, San Francisco, CA (US)

(72) Inventor: Zejian Liu, Hazel Crest, IL (US)

(73) Assignee: McKesson Corporation, Irving, TX (US)

( * ) Notice: Subject to any disclaimer, the term of this patent is extended or adjusted under 35 U.S.C. 154(b) by 256 days.

(21) Appl. No.: 16/828,576

(22) Filed: Mar. 24, 2020

(65) Prior Publication Data
US 2021/0303544 A1    Sep. 30, 2021

(51) Int. Cl.
*G06F 16/23* (2019.01)
*G06F 9/48* (2006.01)
*G06F 16/25* (2019.01)
*G06F 16/28* (2019.01)

(52) U.S. Cl.
CPC ........ *G06F 16/2358* (2019.01); *G06F 9/4843* (2013.01); *G06F 16/25* (2019.01); *G06F 16/284* (2019.01)

(58) Field of Classification Search
None
See application file for complete search history.

(56) References Cited

U.S. PATENT DOCUMENTS

| | | | | |
|---|---|---|---|---|
| 9,170,822 | B1* | 10/2015 | Sharkey | G06F 1/3203 |
| 9,818,075 | B2* | 11/2017 | Roman | H04W 4/029 |
| 2002/0111995 | A1* | 8/2002 | Mansour | H04L 9/40 |
| | | | | 709/213 |
| 2005/0198085 | A1* | 9/2005 | Blakey | G06F 16/27 |
| 2008/0091782 | A1* | 4/2008 | Jakobson | G06Q 10/10 |
| | | | | 709/206 |
| 2010/0180147 | A1* | 7/2010 | Beeston | G06F 11/0709 |
| | | | | 714/E11.023 |
| 2011/0173622 | A1* | 7/2011 | Shin | G06F 9/4856 |
| | | | | 718/102 |
| 2015/0261567 | A1* | 9/2015 | Kim | G06F 9/5027 |
| | | | | 718/104 |
| 2016/0065626 | A1* | 3/2016 | Jain | G06F 9/4856 |
| | | | | 709/205 |
| 2016/0275746 | A1* | 9/2016 | Stinson | G07F 11/62 |
| 2018/0000346 | A1* | 1/2018 | Cronin | A61B 5/00 |
| 2018/0160943 | A1* | 6/2018 | Fyfe | A61B 5/1112 |
| 2019/0175079 | A1* | 6/2019 | Nishida | A61B 5/14532 |
| 2019/0175080 | A1* | 6/2019 | Varsavsky | A61B 5/14865 |
| 2019/0236511 | A1* | 8/2019 | Xu | G06Q 10/0639 |
| 2019/0327889 | A1* | 10/2019 | Borgstadt | A01D 75/28 |
| 2020/0150687 | A1* | 5/2020 | Halder | G08G 1/202 |

* cited by examiner

*Primary Examiner* — Richard L Bowen
(74) *Attorney, Agent, or Firm* — Ballard Spahr LLP

(57) ABSTRACT

Methods, systems, and apparatuses for improved quality assurance (QA) are described herein. A computing device may provide a user interface having multiple user interface elements that allow a user of the computing device to interact with a QA system. Each of the user interface elements may be associated with one or more QA tasks for a type(s) of medical equipment. The computing device may receive input from the user via at least one of the user interface elements. The computing device may determine a completion value for at least one of the QA tasks. The computing device may send an update message indicative of the completion value for the at least one QA task.

20 Claims, 10 Drawing Sheets

FIG. 2D
FIG. 2E
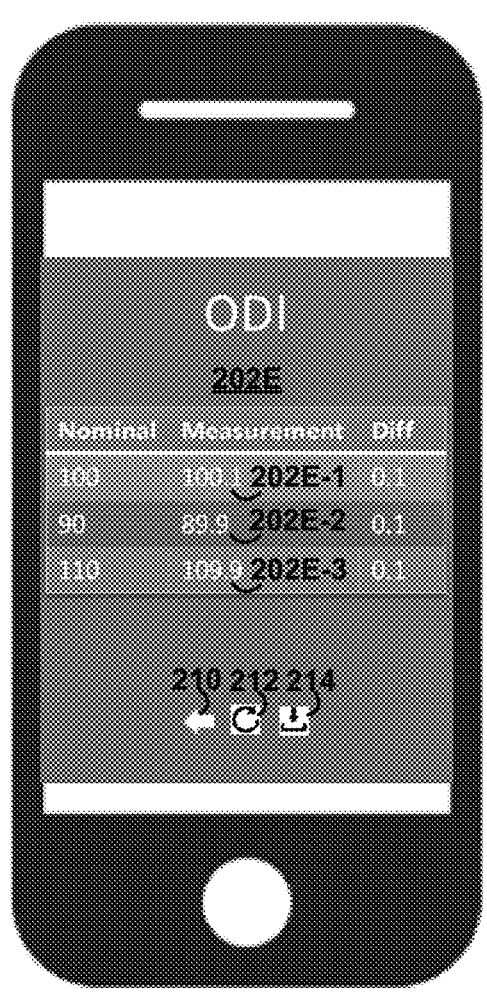

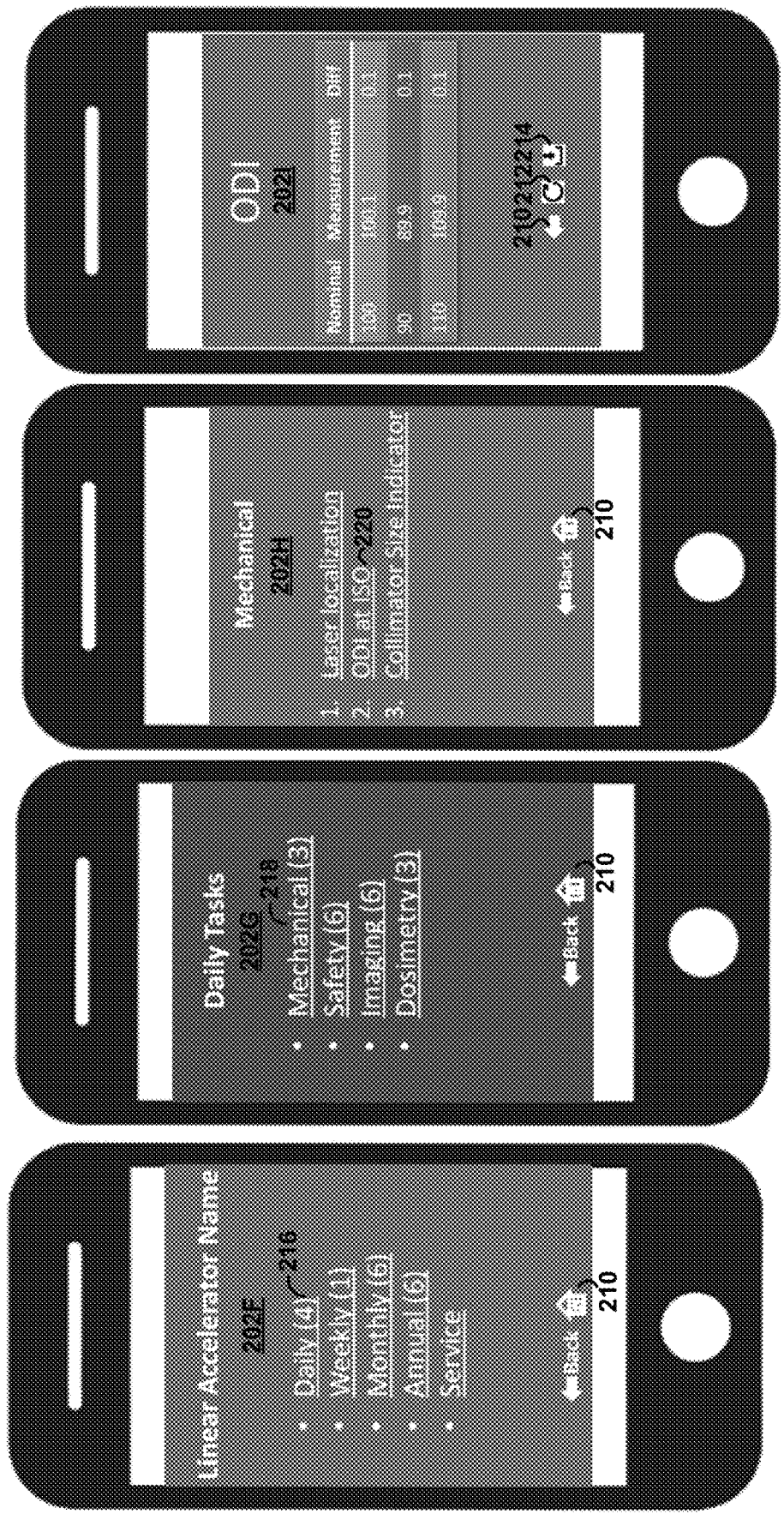

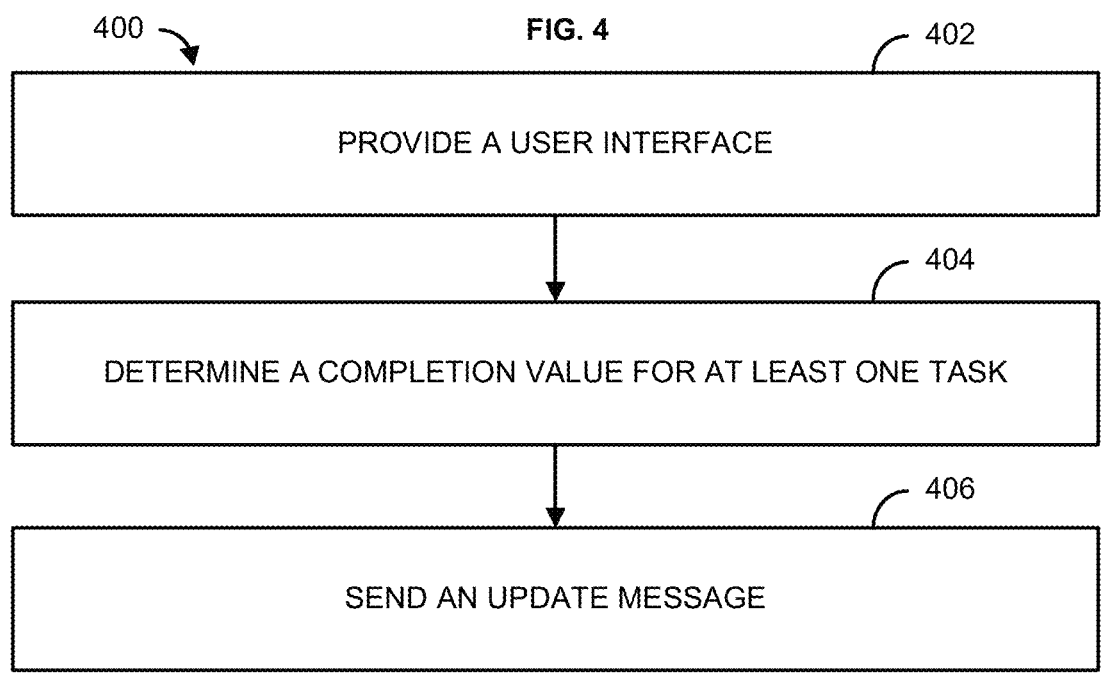

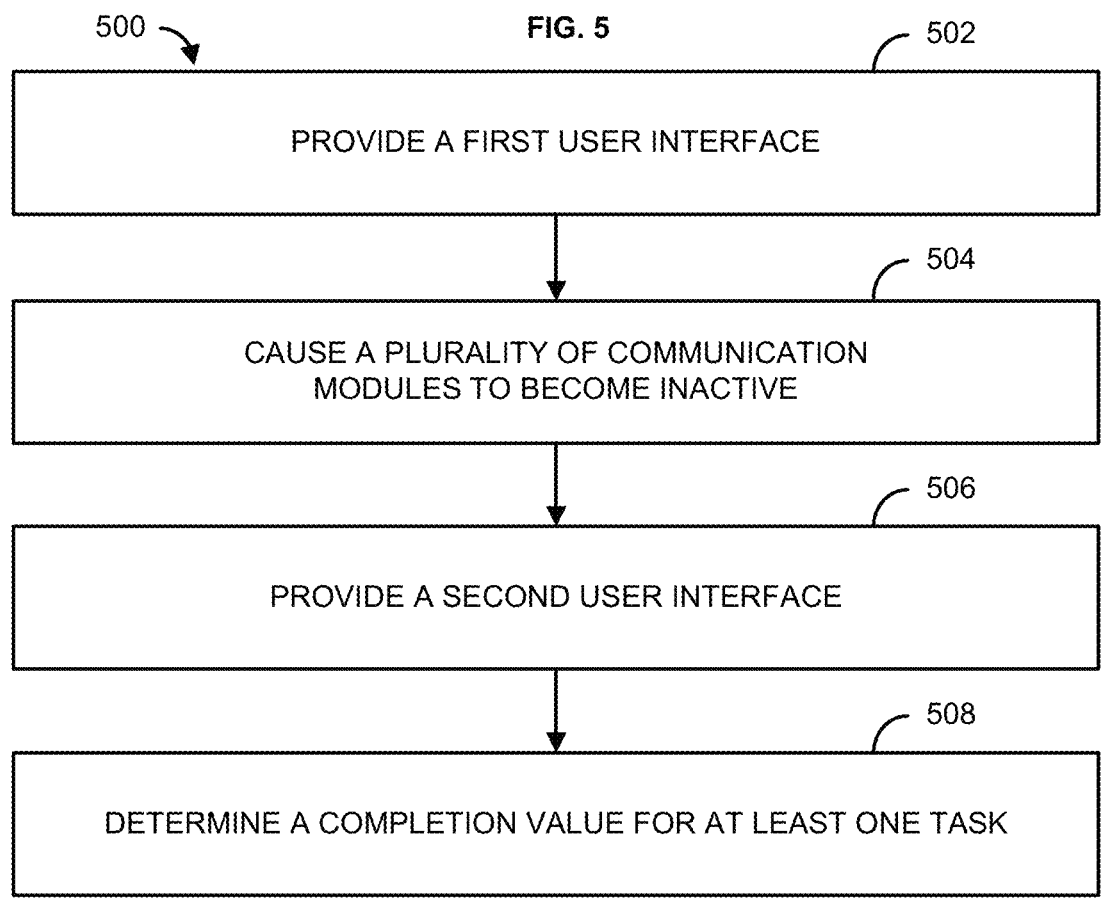

METHODS, SYSTEMS, AND APPARATUSES FOR IMPROVED QUALITY ASSURANCE

BACKGROUND

Quality assurance (QA) processes for medical equipment ensure the equipment operates correctly and treats patients effectively. Current QA processes for certain types of medical equipment are labor intensive and inefficient. For some types of medical equipment, there are hundreds of tasks for that may be hard to manage manually. Additionally, the current QA processes for these types of medical equipment are highly heterogeneous and user dependent. Further, the current QA processes store associated data in isolated folders, which are hard to find and difficult to review by peers. Some QA processes utilize spreadsheet software to manage QA tasks, which are complex and hard to standardize and scale. Other QA processes have created solutions to organize the data in a centralized database and provide a portal for users to input the data. However, none of the currently used QA processes have attempted to simplify and automate the corresponding QA tasks at the user's end. Moreover, these existing solutions are rendered useless when a wireless network is not available due to shielding that is common in medical treatment rooms housing medical equipment. These and other considerations are addressed by the present description.

SUMMARY

It is to be understood that both the following general description and the following detailed description are exemplary and explanatory only and are not restrictive. Methods, systems, and apparatuses for improved quality assurance (QA) are described herein. In one example, a first computing device may provide a user interface having multiple user interface elements that allow a user of the first computing device to interact with a QA system. Each of the user interface elements may be associated with one or more QA tasks for a type(s) of medical equipment. The first computing device may receive input from the user via at least one user interface element of the user interface elements during a period of non-connectivity. Despite being a period of non-connectivity, the first computing device may determine a completion value for at least one QA tasks of the QA tasks. The first computing device may then send an update message indicative of the completion value for the at least one QA task. The message may be sent to a second computing device during a period of connectivity for the first computing device.

In another example, a first computing device may provide a first user interface having multiple user interface elements, however, at least one user interface element of the user interface elements may not accept user input. Each of the multiple user interface elements may be associated with at least one QA task. The first computing device may receive a command that causes it to place one or more communication modules in an inactive state. In response to the one or more communication modules being in the inactive state, the first computing device may provide a second user interface having the multiple user interface elements, however, the at least one user interface element may now accept user input. The first computing device may receive input from the user via the at least one user interface element. Despite the one or more communication modules being in the inactive state, the first computing device may determine a completion value for at least one QA task of the QA tasks associated with the at least one user interface element.

In a further example, a first computing device may receive a request to launch an application associated with a user interface. In response to receiving the request to launch the application, the first computing device may cause a plurality of communication modules to become inactive. The first computing device may provide the user interface having multiple user interface elements. Each of the multiple user interface elements may be associated with at least one QA task. The first computing device may receive input from the user via at least one user interface element. Despite the one or more communication modules being inactive, the first computing device may determine a completion value for at least one QA task of the QA tasks associated with the at least one user interface element. Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of the present description serve to explain the principles of the methods and systems described herein:

FIGS. 2A-2I show example user interfaces;
FIG. 4 shows a flowchart of an example method;
FIG. 5 shows a flowchart of an example method.

DETAILED DESCRIPTION

Figure 1A:
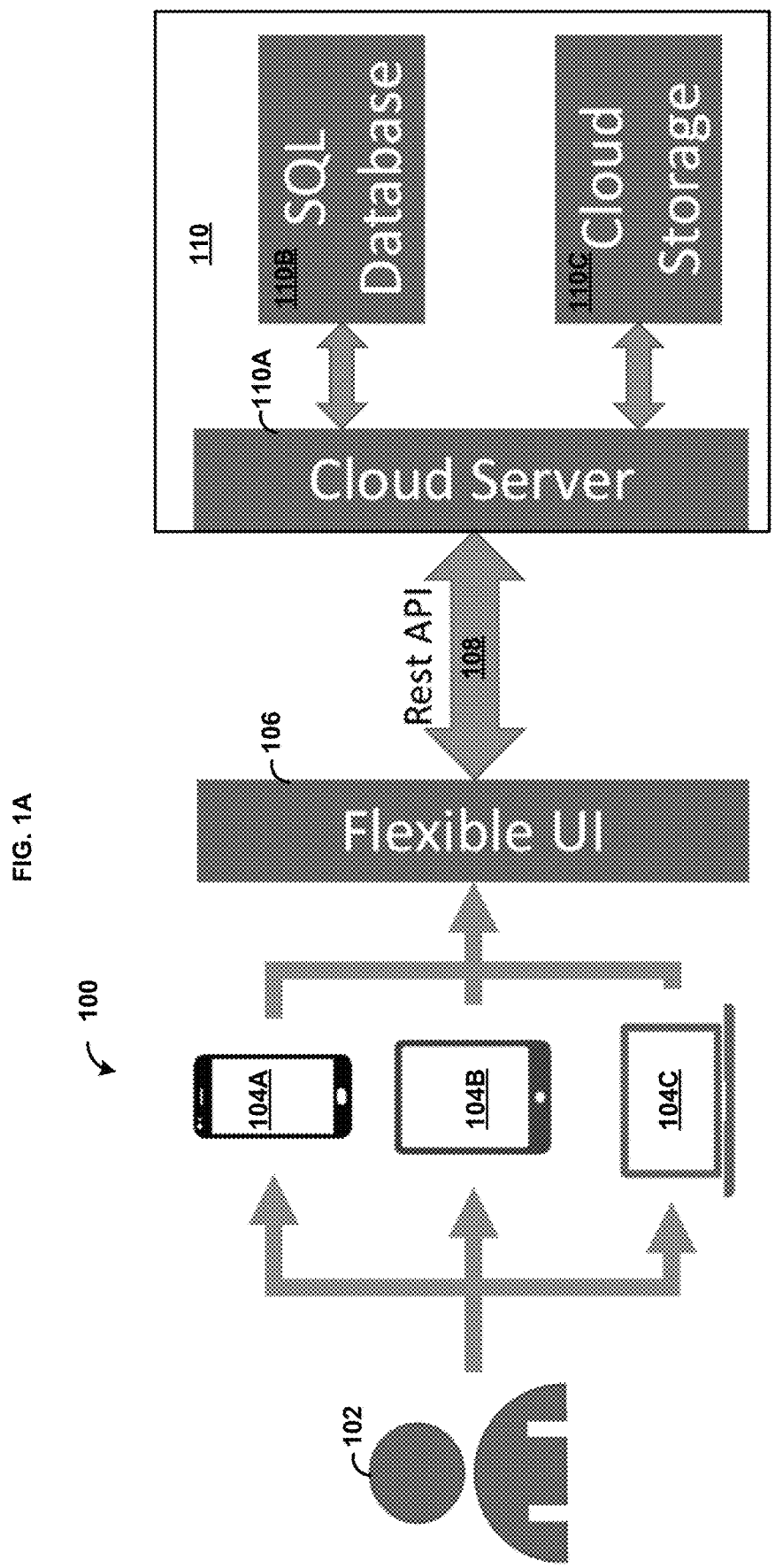
FIG. 1A shows a block diagram of an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

Described herein are methods, systems, and apparatuses for improved quality assurance (QA) processes. In one example, a first computing device may provide a user interface having multiple user interface elements that allow a user of the first computing device to interact with a QA system. The first computing device may be a mobile device, such as a laptop, a tablet, a smartphone, etc. Each of the user interface elements may be associated with one or more QA tasks for a type(s) of medical treatment apparatus. The medical treatment apparatus may be a linear accelerator, a CT machine, an MRI machine, and the like. The first computing device may receive input from the user via at least one user interface element of the user interface elements during a period of non-connectivity. The period of non-connectivity may correspond to a period of time during which the first computing device is not associated with a wireless network (e.g., due to lack of signal). Despite being a period of non-connectivity, the first computing device may determine a completion value for at least one QA task of the QA tasks.

The first computing device may then send an update message indicative of the completion value for the at least one QA task. The first computing device may provide an updated user interface indicating the completion value for the at least one QA task. The update message may be sent to a second computing device during a period of connectivity for the first computing device. For example, the second computing device may be a server, and the period of connectivity may correspond to a period of time during which the first computing device is in communication with the server via at least one wireless network. The server may cause a database associated with the medical treatment apparatus to be updated based on the update message sent by the first computing device.

In another example, the first computing device may provide a first user interface having multiple user interface elements, however, at least one user interface element of the user interface elements may not accept user input. Each of the multiple user interface elements may be associated with at least one QA task. The first computing device may receive a command that causes it to place one or more communication modules in an inactive state. A communication module may be, for example, a wireless receiver and/or transceiver, such as a WiFi module, a Bluetooth module, an antenna module, and the like. In response to the one or more communication modules being in the inactive state, the first computing device may provide a second user interface having the multiple user interface elements, however, the at least one user interface element may now accept user input. The first computing device may receive input from the user via the at least one user interface element. Despite the one or more communication modules being in the inactive state, the first computing device may determine a completion value for at least one QA task of the QA tasks associated with the at least one user interface element. Further, while the one or more communication modules are in the inactive state, the first computing device may generate an update message indicative of the updated completion value for the at least one QA task. During a subsequent period of connectivity, the first computing device may send the update message to the second computing device. The period of connectivity may correspond to a period of time during which the plurality of communication modules are active.

In a further example, a first computing device may receive a request to launch an application associated with a user interface. In response to receiving the request to launch the application, the first computing device may cause the plurality of communication modules to become inactive. The first computing device may provide the user interface having the multiple user interface elements. Each of the multiple user interface elements may be associated with at least one QA task. The first computing device may receive input from the user via at least one user interface element. Despite the one or more communication modules being inactive, the first computing device may determine a completion value for at least one QA task of the QA tasks associated with the at least one user interface element. Further, while the one or more communication modules are inactive, the first computing device may generate an update message indicative of the updated completion value for the at least one QA task. During a subsequent period of connectivity, the first computing device may send the update message to the second computing device. The period of connectivity may correspond to a period of time during which the plurality of communication modules are active. The second computing device may be a server, and the period of connectivity may correspond to a period of time during which the first computing device is in communication with the server via at least one wireless network. The server may cause a database associated with the medical treatment apparatus to be updated based on the update message sent by the first computing device.

Turning now to FIG. 1A, a block diagram of an example system 100 for improved quality assurance (QA) processes is shown. The system 100 may include a user 102 that interacts with one or more user devices 104A, 104B, 104C via a user interface 106. The user device 104A may be a smartphone or other mobile device, the user device 104B may be a tablet or other mobile device, and the user device 104C may be a laptop or other mobile device. The user interface 106 may be compatible with each of the user devices 104A, 104B, 104C. Further, each of the user devices 104A, 104B, 104C may be in communication with an application management system 110 via an application programming interface (API) 108. The application management system 110 may be a QA system, and the user interface 106 may include a plurality of user interface elements that are associated with one or more QA tasks for a type(s) of medical treatment apparatus. The application management system 110 may include a plurality of storage mediums 110A, 110B, 110C. The storage medium 110A may be a cloud-based server, the storage medium 110B may be an SQL database, and the storage medium 110C may be a cloud storage repository.

The user 102 may interact with the user interface 106 provided by at least one user device of the user devices 104A, 104B, 104C in order to communicate with the application management system 110. For example, the at least one user device 104A, 104B, 104C may receive input from the user 102 via at least one element of the user interface 106 during a period of non-connectivity. The period of non-connectivity may correspond to a period of time during which the at least one user device 104A, 104B, 104C is not associated with a wireless network (e.g., due to lack of signal) and in communication with the application management system 110. Despite being a period of non-connectivity, the at least one user device 104A, 104B, 104C may determine a completion value for at least one QA task of the QA tasks using a plurality of logic stored thereon. The plurality of logic stored at the at least one user device 104A, 104B, 104C may be in the form of a mobile application.

The at least one user device 104A, 104B, 104C may send an update message indicative of the completion value for the at least one QA task during a subsequent period of connectivity and communication session with the application management system 110. The update message may be sent by the at least one user device 104A, 104B, 104C via the API 108. The at least one user device 104A, 104B, 104C may provide an updated user interface 106 indicating the completion value for the at least one QA task. The application management system 110 may receive the update message and cause at least one storage medium of the plurality of storage mediums 110A, 110B, 110C to be updated based on the update message.

Figure 1B:
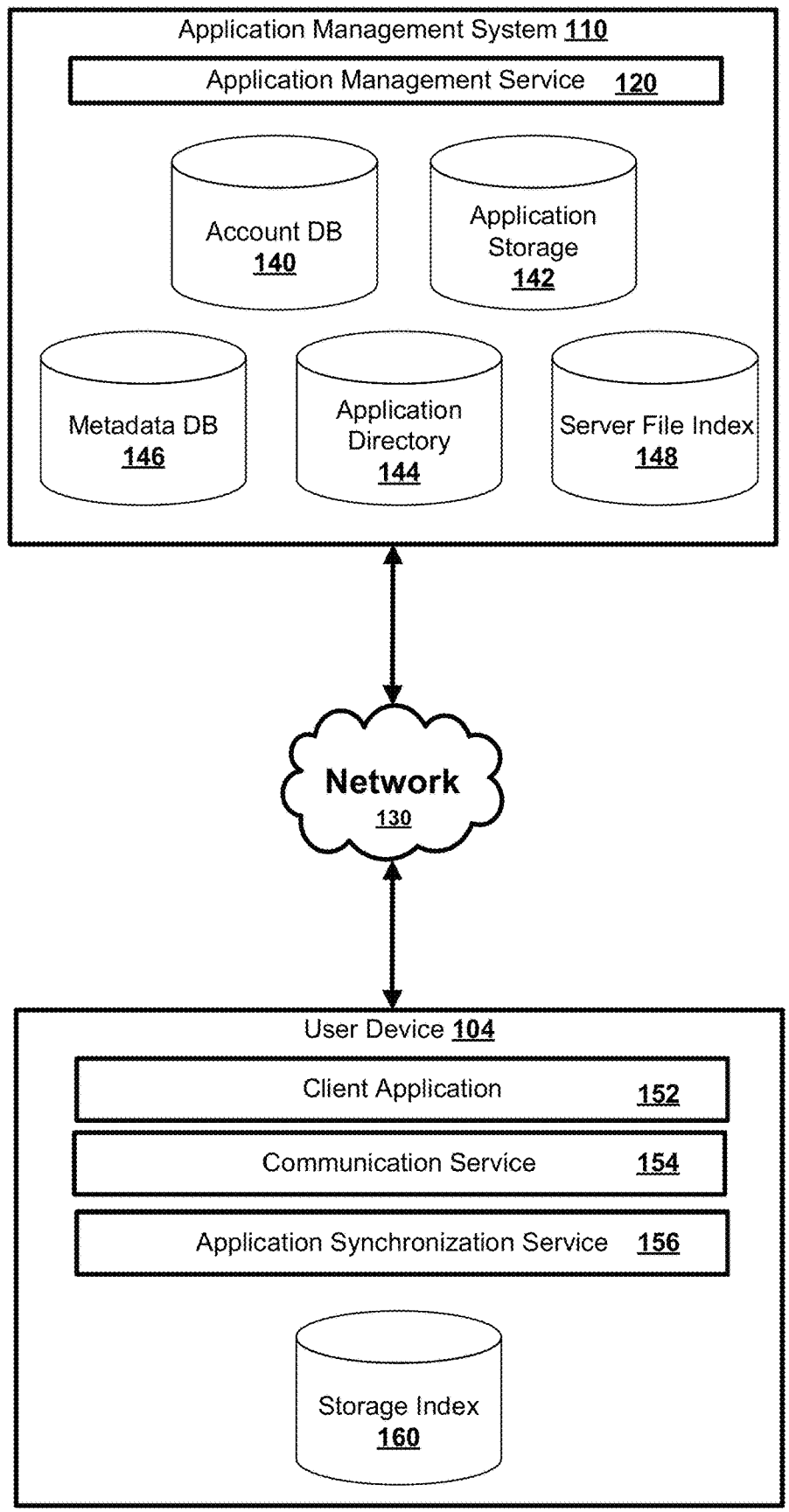
FIG. 1B shows a block diagram of an example system.

FIG. 1B shows an expanded block diagram of the application management system 110 and the at least one user device 104A, 104B, 104C (hereinafter, referred to as "the user device 104"). The application management system 110 may have a plurality of storage mediums/databases, such as an account database 140, an application storage database 142, an application directory 144, a server file index 148, and/or a metadata database 146. Any of the account database 140, the application storage database 142, the application directory 144, the server file index 148, or the metadata database 146 may be any of the storage mediums 110A, 110B, 110C. The application management system 110 may store application items in association with user accounts. The application management system 110 may enable a user to access application item(s) from multiple user devices via a network 130 (e.g., Internet; cellular data networks, including 3G, LTE, etc.; wide area networks; local area networks; virtual networks, wireless networks, etc.). The network 130 may provide communication between the application management system 110 and the user device 104 via the API 108. For example, the user device 104 may have a communication service 154 having a plurality of communication modules (e.g., a wireless receiver and/or transceiver, such as a WiFi module, a Bluetooth module, an antenna module). The user device 104 may use the communication service 154 to communicate with the application management system 110 via the API 108 and the network 130.

The application management system 110 may support a plurality of accounts. A user(s) may create an account with the application management system 110, and account details may be stored in an account database 140. The account database 140 may store profile information for registered users. In some cases, profile information for a registered user may include a username and/or email address. The account database 140 may include account management information, such as account type (e.g., administrator vs. normal user), security settings, personal configuration settings, etc.

The account database 140 may store groups of accounts associated with a user group. A user group may have permissions based on group policies and/or access control lists. For example, a QA group may have access to one set of application items while an engineering group may have access to another set of application items. An administrator of a user group may modify groups, modify user accounts, etc. The application items may be stored in an application storage database 142. The application items may be any digital data such as documents, collaboration application items, text files, audio files, image files, video files, webpages, executable files, binary files, SQL queries, update messages, QA task completion data, etc. The application storage database 142 may be combined with other types of storage mediums or databases to handle specific functions. The application storage database 142 may store application items, while metadata associated with the application items may be stored in a metadata database 146. The metadata associated with the application items may include one or more a date, a time, a user identifier, a user device identifier, a changelog, and the like. Data identifying where an application item is stored in the application storage database 142 may be stored in an application directory 144. Additionally, data associated with changes, access, etc. may be stored in a server file index 148. Each of the various storage mediums/ databases, such as the application storage database 142, the application directory 144, the server file index 148, and the metadata database 146 may include more than one such storage medium or database and may be distributed over many devices and locations. Other configurations are also possible. For example, data from the application storage database 142, the application directory 144, the server file index 148, and/or the metadata database 146 may be combined into one or more content storage mediums or databases or further segmented into additional storage mediums or databases. Thus, the application management system 110 may include more or less storages mediums and/or databases than shown in FIG. 1.

The application storage database 142 may be associated with an application management service 120, which may have software or other processor executable instructions for managing the storage of application items including, but not limited to, receiving application items for storage, preparing application items for storage, updating application items, selecting a storage location for an application item, retrieving application items from storage, etc. The application management service 120 may divide an application item into smaller blocks of data for storage at the application storage database 142. The location of each data block making up an application item may be recorded in an application directory 144. The application directory 144 may include an entry for each application item stored in the application storage database 142. The entry may be associated with a unique ID, which identifies an application item.

As discussed herein, an entry in the application directory 144 may also include the location of each block of data making up an application item. The entry may include content pointers that identify the location in the application storage database 142 of the data blocks that make up the application item. Further, an entry in the application directory 144 may also include a user account identifier that identifies the user account that has access to the application item and/or a group identifier that identifies a user group with access to the application item. A user account identifier associated with a single entry may specify different permissions for the associated application item.

The application management service 120 may also store metadata describing application items, application item types, and/or the relationship of application items to various user accounts, collections, or user groups in the metadata database 146, in association with the unique ID of the application item. The application management service 120 may also store a log of data regarding changes, access, etc. (e.g., a changelog) in the server file index 148. The server file index 148 may include the unique ID of the application item and a description of the change or access action along with a time stamp or version number and any other relevant data. For example, the application item may be piece of data indicating a completion value for a QA task. The server file index 148 may include the unique ID associated with the application item and a description of the change (e.g., completion value update) or access action (e.g., an indication of a received update message that causes the application item/completion value to be updated), etc. The server file index 148 may also include pointers to blocks of data affected by the change or application item access.

The application management service 110 may provide the ability to undo operations, by using an application item version control service that tracks changes to application items, different versions of application items (e.g., diverging version trees), and a change history that may be acquired from the server file index 148. The change history may include a set of changes that, when applied to the original application item version, produces the changed application item version. For example, a user of the user device 104 may provide an update message that causes an application item (e.g., a completion value for a QA task) to be updated. At a time just prior to the user device 104 sending the update message, another user of another user device (not shown) may send a further update message for the same application item. The application management service 110 may determine that the user device 104 is associated with an administrator account, and the application management service 110 may undo any changes made to the application item in response to the other user sending the other update message (e.g., by referring to the server file index 148).

As described herein, the user device 104 may be in communication with the application management system 110 in order to provide update messages for application items. The application items may be associated with QA tasks for certain medical equipment. The medical equipment may be sensitive to wireless signals (e.g., WiFi, cellular, etc.). Thus, the medical equipment may be housed in purpose-built rooms with shielding (e.g., lead, metallic mesh, etc.) in order to block wireless signals from penetrating walls of the rooms and interfering with the medical equipment. Accordingly, the network 130 may not be available to the user device 104 while the user device 104 is proximate to the medical equipment. The user device 104 may therefore have a client application 152 (e.g., the user interface 106) stored thereon (e.g., in memory of the user device 104). The client application 152 may provide front-end logic at the user device 104 to enable a user of the user device 104 to interact with the client application 152 while the user device 104 is not connected to the network 130 during a period of non-connectivity.

The user device 104 may experience a period of non-connectivity due to a lack of a wireless signal needed to communicate with the network 130 (e.g., as a result of distance from an access point and/or a signal blocking material). Further, the user device 104 may be caused to experience a period of non-connectivity in response to a command received via the client application 152. For example, the client application 152 may be configured to cause the communication service 154 to become inactive once an attempt is made to launch (e.g., open) the client application 152. As another example, the user device 104 may be caused to experience a period of non-connectivity in response to a user of the user device disabling the communication service 154 (e.g., by entering an "Airplane" or similar mode of operation of the user device 104).

While the user device 104 is experiencing a period of non-connectivity, the client application 152 may be used to determine a completion value for at least one QA task. As described further herein, the client application 152 may generate an update message associated with the determined completion value for the at least one QA task. The client application 152 may store the update message in a storage index 160 until the user device 104 is able to communicate with the network 130 and synchronize with the application management system 110. The application management system 110 may synchronize application items with the user device 104. The user device 104 may take different forms and have different capabilities. For example, the user device 104 may be a computing device having a local file system accessible by multiple applications executing on the device. As another example, the user device 104 may be a computing device in which application items may only be accessible to a specific application or by permission given by the specific application, and the application items may be stored in an application specific space and/or in a remote network.

As a further example, the user device 104 may access the application management system 110 via a web browser. In still a further example, the user device 104 may be a mobile device that may have a local file system accessible by multiple applications executing on the device.

The client application 152 may include an application item synchronization service 156. The application item synchronization service 156 may be in communication with the application management service 120 to synchronize changes to application items between the user device 104 and the application management system 110. The user device 104 may synchronize application items with the application management system 110 via the application item synchronization service 156. Synchronization may be platform agnostic. That is, application items may be synchronized across multiple user devices of varying types, capabilities, operating systems, etc. The application synchronization service 156 may synchronize any changes (e.g., new, deleted, modified, copied, or moved application items) to application items in a designated location of a file system of the user device 104.

Application items may be synchronized from the user device 104 to the application management system 110, and vice versa. The user device 104 may initiate synchronization of application items with the application management system 110 —allowing a user to manipulate application items directly from the file system of the user device 104. When the client application 152 detects a change to an application item stored locally at the user device 104, the client application 152 may notify the application item synchronization service 156, which may synchronize the changes to the application management system service 120. The application item synchronization service 156 may perform some functions of the application management system service 120, including dividing an application item into blocks, generate a unique ID for an application item, etc. The application item synchronization service 156 may index application items within the storage index 160 and save the result in the storage index 160. Indexing may include creating a unique ID for each application item. The application item synchronization service 156 may use the storage index 160 to facilitate synchronization of at least a portion of application data stored at the user device 104 with a user account stored at the application management system 110.

For example, the application item synchronization service 156 may compare the storage index 160 with the application management system 110 and detect differences between application items stored at the user device 104 and application items associated with a user account at the application management system 110. The application item synchronization service 156 may then attempt to reconcile differences by uploading, downloading, modifying, and/or deleting application items (or portions thereof) stored at the user device 104 as appropriate. The application management service 120 may store the changed or new block for the application item and update the server file index 148, the metadata database 146, the application directory 144, the application storage database 142, the account database 140, etc., as appropriate.

When synchronizing application items between the application management system 110 and the user device 104, a modification, addition, deletion, and/or move of an application item recorded in the server file index 148 may trigger delivery of a notification to the user device 104. When the user device 104 receives the notification of the change to the server file index 148, the user device 104 may check the storage index 160 to determine if the time stamp of the change occurred since the last synchronization, or determine if the specific change has been synchronized. When the user device 104 determines that it is out of synchronization with the application management system 110, the application item synchronization service 156 may request application item blocks including the changes, and the user device 104 may update its local copy of the changed application items.

As described herein, the user device 104 might not have access to the network 130 when the user device 104 is within a room that blocks wireless signals. In this scenario, the application item synchronization service 156 may monitor application item changes and queue those changes for later synchronization to the application management system 110 when the network 130 (or any other network associated with the application management system 110) is available. Similarly, a user of the user device 104 may manually start, stop, pause, or resume synchronization with the application management system 110. The application item synchronization service 156 may synchronize all application items associated with a particular user account on the application management system 110. The application item synchronization service 156 may selectively store a portion of an application item associated with the particular user account and store placeholder application items in the storage index 160 for the remainder portion of the content. For example, the application item synchronization service 156 may store a placeholder application item that has the same filename, path, extension, metadata, of its respective complete application item on the application management system 110, but lacking the data of the complete application item. The placeholder application item may be a few kilobytes or less in size while the respective complete application item might be significantly larger. After the user device 104 attempts to access the application item, the application item synchronization service 156 may retrieve the data of the application item from the application management system 110 and provide the complete application item to the user device 104.

Figure 2C:
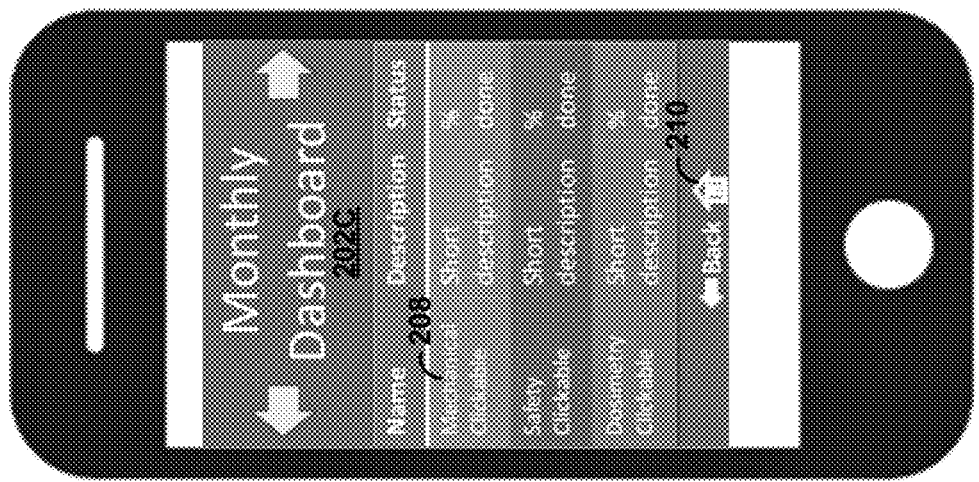
Figure 2B:
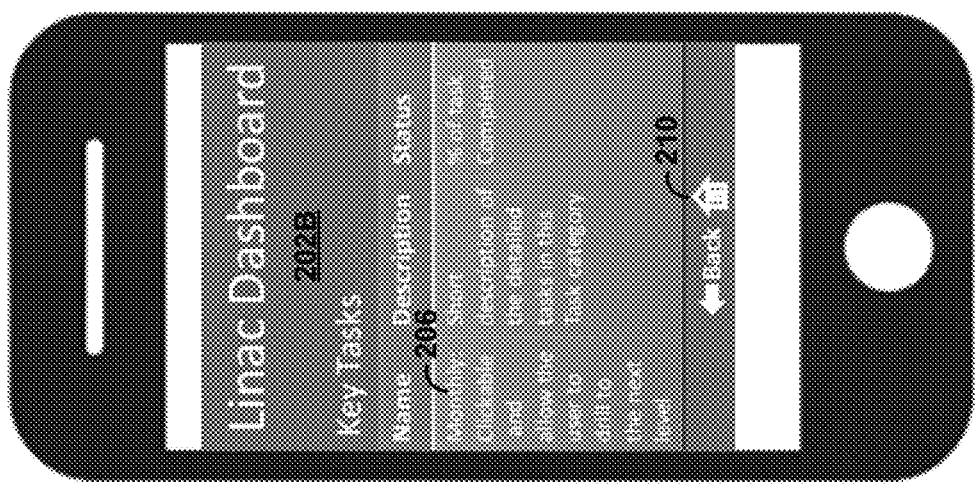
Figure 2A:
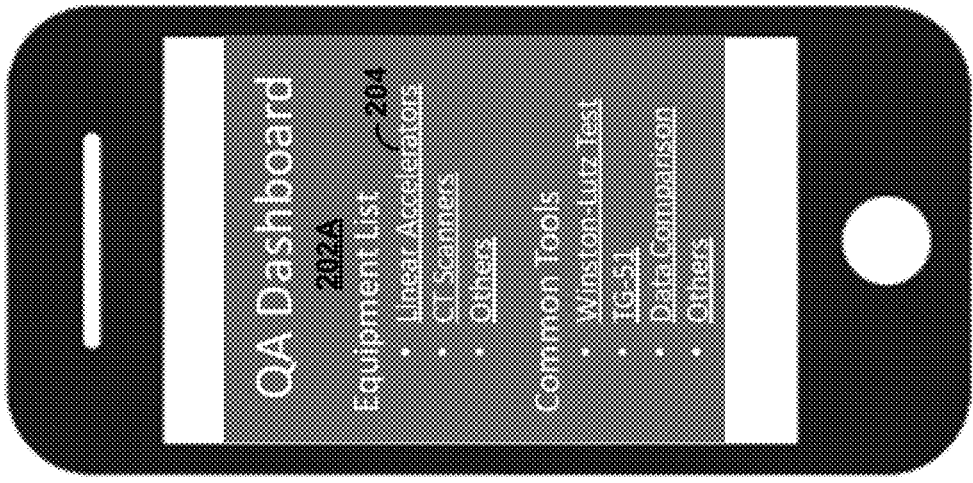

Turning now to FIGS. 2A-2I, example user interfaces, such as the user interface 106, for the client application 152 are shown. The user interfaces may correspond to various menus and visualizations provided by the client application 152 at the user device 104. As shown in FIG. 2A, a user interface 202A is provided. The user interface 202A may correspond to a "home" or "main" page of the client application 152. The user interface 202A may include one or more links that a user may select via the user interface 202A. For example, a link 204 provided at the user interface 202A may correspond to a certain medical equipment apparatus, such as a linear accelerator (referred to herein as a "Linac" or simply a "LA"). Note that while FIGS. 2A-2I specifically refer to a Linac, other medical equipment apparatuses may be referred to by other user interfaces of the client application 152. When the user selects the link 204, the client application 152 may cause the user device 104 to provide a user interface 202B, as shown in FIG. 2B. The user interface 202B may include a "home/back" button 210, which may cause the user device 104 to present the user interface 202A when a user selects the button 210.

The user interface 202B may include a listing of QA task frequencies for the Linac, which may each include a name, a description, and a status (e.g., a completion value). For example, a QA task frequency may be "Monthly," and the user interface 202B may include button 206 to allow a user to select the "Monthly" frequency. When a user does so, the client application 152 may cause the user device 104 to provide a user interface 202C, as shown in FIG. 2C.

The user interface 202C may include the "home/back" button 210, which may cause the user device 104 to present the user interface 202A when a user selects the button 210. The user interface 202C may include a QA task dashboard, such as a "Monthly Dashboard" as shown in FIG. 2C. The user interface 202C may list a plurality of QA task categories associated with the selected frequency. For example, a QA task category may be "Mechanical," as indicated by the button 208. Selection by a user of the button 208 may prompt the client application 152 to cause the user device 104 to provide a user interface 202D, as shown in FIG. 2D.

The user interface 202D may include the "home/back" button 210, which may cause the user device 104 to present the user interface 202A when a user selects the button 210. The user interface 202D may include a QA task category dashboard, such as a "Mechanical Dashboard" as shown in FIG. 2D. The QA task category dashboard may include a list of QA tasks (e.g., procedures) and a tolerance level and status indicator for each. For example, a QA task listed in the QA task category dashboard may include Optical Distance Indicator ("ODI"). Each QA task listed in the QA task category dashboard may be associated with a button, such as button 212. Selection by a user of the button 208 may prompt the client application 152 to cause the user device 104 to provide a user interface 202E, as shown in FIG. 2E.

The user interface 202E may include the "home/back" button 210, which may cause the user device 104 to present the user interface 202A when a user selects the button 210. The user interface 202E may include a QA task dashboard, such as for "ODI," and a listing of tasks. For example, as shown in FIG. 2E, the listing of tasks may each include a "Nominal" value, a "Measurement" value, and a "Diff" (e.g., differential) value. Each nominal value may be inaccessible by a user of the user device 104 for editing (e.g., nominal values may be pre-determined). Each measurement value, however, may be accessible by a user of the user device 104 for editing. Each measurement value 202E-1, 202E-2, 202E-3 may be selectable by the user via the user interface 202E. Selecting a measurement value 202E-1, 202E-2, 202E-3 may allow the user to edit a current value or enter a new value. When a measurement value 202E-1, 202E-2, 202E-3 is edited, a corresponding differential value may be calculated based on the corresponding nominal value and the new/edited measurement value.

Each measurement value 202E-1, 202E-2, 202E-3 may be stored locally at the user device 104 as described herein as an application item (e.g., in the storage index 160). When the client application 152 detects a change to a measurement value 202E-1, 202E-2, 202E-3, the client application 152 may notify the application item synchronization service 156, which may synchronize the changes to the application management system service 120. Alternatively, when the client application 152 detects a change to a measurement value 202E-1, 202E-2, 202E-3 while the user device 104 is not in communication with the application management system 110 (e.g., during a period of non-connectivity), the client application 152 may store change data associated with the measurement value 202E-1, 202E-2, 202E-3 for later synchronization with the application management system 110.

The user interface 202E may include a "refresh" button 212. When a user selects the button 212, the client application 152 may synchronize an application item(s) associated with the measurement values 202E-1, 202E-2, 202E-3. In this way, the measurement values 202E-1, 202E-2, 202E-3 may be updated as-needed by the user of the user device 104 (e.g., to retrieve newly edited measurement values entered by another user or during a prior session). The user interface 202E may include a "download" button 214. When a user selects the button 214, the client application 152 may notify the application item synchronization service 156, which may synchronize any changes to the application management system service 120. Alternatively, when a user selects the button 214 while the user device 104 is not in communication with the application management system 110 (e.g., during a period of non-connectivity), the client application 152 may store change data associated with the measurement values 202E-1, 202E-2, 202E-3 for later synchronization with the application management system 110.

Turning now to FIGS. 2F-2I, show example user interfaces having a different layout than the user interfaces shown in FIGS. 2A-2D. The user interfaces shown in FIGS. 2F-2I may permit similar functionality as the user interfaces shown in FIGS. 2A-2D. As shown in FIG. 2F, a user interface 202F is provided. The user interface 202G may include the "home/back" button 210, which may cause the user device 104 to present the user interface 202A when a user selects the button 210. The user interface 202F may include one or more links that a user may select via the user interface 202F. The user interface 202F may include a listing of QA task frequencies for a medical equipment apparatus, which may each include an indicator of a number of QA tasks outstanding for a given category. For example, a QA task frequency may be "Daily," and the user interface 202F may include button 216 to allow a user to select the "Daily" frequency. When a user does so, the client application 152 may cause the user device 104 to provide a user interface 202G, as shown in FIG. 2G.

The user interface 202G may include the "home/back" button 210, which may cause the user device 104 to present the user interface 202A when a user selects the button 210. The user interface 202G may include a QA task dashboard, such as a "Daily Tasks" dashboard as shown in FIG. 2G. The user interface 202G may list a plurality of QA task categories associated with the selected frequency, which may each include an indicator of a number of QA tasks outstanding for a given category. For example, a QA task category may be "Mechanical," as indicated by the button 218. Selection by a user of the button 218 may prompt the client application 152 to cause the user device 104 to provide a user interface 202H, as shown in FIG. 2H.

The user interface 202H may include the "home/back" button 210, which may cause the user device 104 to present the user interface 202A when a user selects the button 210. The user interface 202H may include a QA task category dashboard, such as a "Mechanical" dashboard as shown in FIG. 2H. The QA task category dashboard may include a list of QA tasks (e.g., procedures). For example, a QA task listed in the QA task category dashboard may include "ODI at ISO." Each QA task listed in the QA task category dashboard may be associated with a button, such as button 220 associated with the "ODI at ISO" QA task category. Selection by a user of the button 220 may prompt the client application 152 to cause the user device 104 to provide the user interface 202E, as shown in FIG. 2E.

Figure 3A:
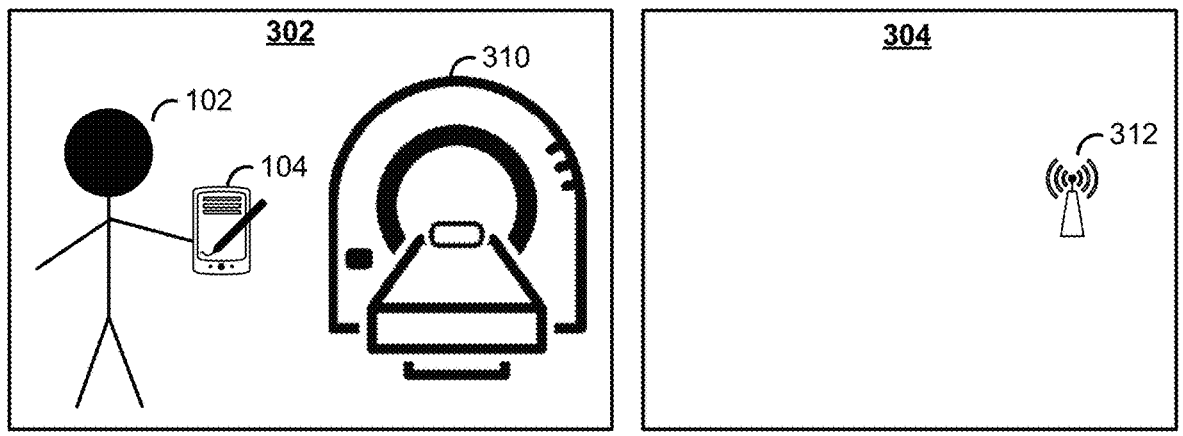
FIGS. 3A and 3B show example operating environments.
Figure 3B:
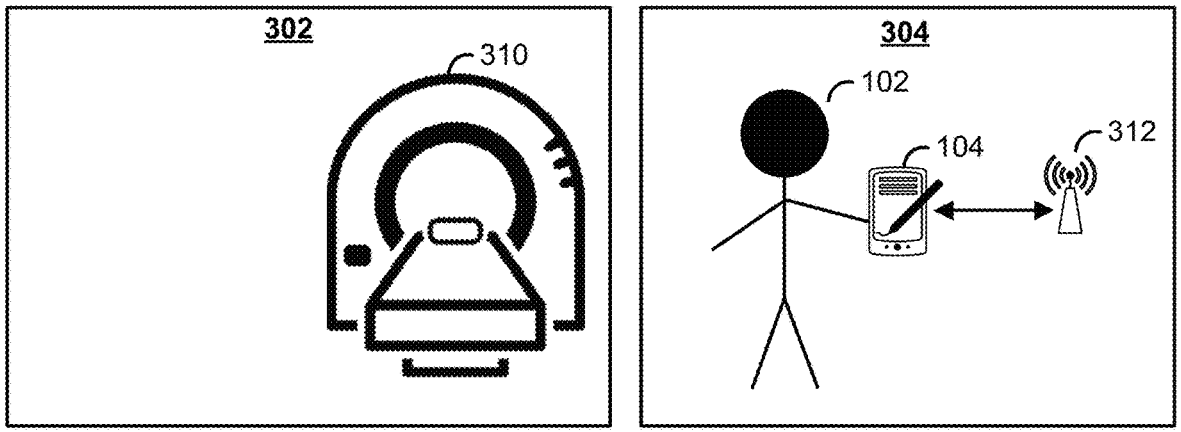

Turning now to FIGS. 3A and 3B, example operating environments are shown. As described herein, the user device 104 may be in communication with the application management system 110. The application items may be associated with QA tasks for certain medical equipment, such as the medical equipment apparatus 310 shown in FIGS. 3A and 3B. The medical equipment apparatus 310 may be sensitive to wireless signals (e.g., WiFi, cellular, etc.). Thus, the medical equipment apparatus 310 may be housed in a purpose-built room 302 with shielding (e.g., lead, metallic mesh, etc.) in order to block wireless signals from penetrating walls of the room 302 and interfering with the medical equipment apparatus 310. Accordingly, the network 130 may not be available to the user device 104 while the user device 104 is inside the room 302. The client application 152 may provide front-end logic at the user device 104 to enable a user of the user device 104 to interact with the client application 152 while the user device 104 is not connected to the network 130 due to being inside the room 302.

Accordingly, the client application 152 may provide the user device 104 with multiple access modes. The user device 104 may have at least two access modes: a primary access mode and a secondary access mode. Each access mode may provide different restrictions for accessing or interacting with certain features of the client application 152. The primary access mode of the user device 104 device may provide full access to all functionality of the client application 152 that is available to a user. The secondary access mode may provide access to a limited set of functions of the client application 152. For example, when operating in the secondary access mode, the client application 152 may restrict user access to certain user interface elements, such as the measurement values 202E-1, 202E-2, 202E-3 of the user interface 202E. As another example, when operating in the secondary access mode, the client application 152 may allow the user to interact with the measurement values 202E-1, 202E-2, 202E-3 of the user interface 202E, and in such a scenario the client application 152 may automatically save any changes the user makes to any of the measurement values 202E-1, 202E-2, 202E-3 for subsequent synchronization with the application management system 110.

The client application 152 may cause the user device 104 to function in the primary access mode during a period of connectivity (e.g., when the user device 104 is in communication with the network 130). The client application 152 may cause the user device 104 to function in the secondary access mode during a period of non-connectivity. As described above, the user device 104 may experience a period of non-connectivity due to a lack of a wireless signal needed to communicate with the network 130 (e.g., as a result of distance from an access point and/or a signal blocking material). Further, the user device 104 may be caused to experience a period of non-connectivity in response to a command received via the client application 152. For example, the client application 152 may be configured to cause the communication service 154 to become inactive once an attempt is made to launch (e.g., open) the client application 152. As another example, the user device 104 may be caused to experience a period of non-connectivity in response to a user of the user device disabling the communication service 154 (e.g., thereby causing the user device 104 to function in the secondary access mode).

Returning to FIGS. 3A and 3B, the user device 104 may be caused to enter the secondary access mode (e.g., by the client application's 152 configuration, in response to a command that causes the communication service 154 to become inactive, etc.). The secondary access mode may allow the user to access the client application 152 (e.g., or portions thereof) while the user device 104 is proximate to the medical equipment apparatus 310. While in the room 302 that houses the medical equipment apparatus 310, the user may interact with the client application 154 to make one or more changes to any of the measurement values 202E-1, 202E-2, 202E-3. For example, the user may take one or more measurements, or derive one or more measurements, based on certain aspects of the medical equipment apparatus 310, such as those shown in the user interface 202D of FIG. 2D.

The room 302 that houses the medical equipment apparatus 310 may be proximate to a room 304 that includes a gateway device 312 for accessing the network 130 via the user device 104. While in the secondary mode of operation, the user device 104 may not be in communication with the gateway device 312. As shown in FIG. 3B, the user may exit the room 302 that houses the medical equipment apparatus 310 and enter the room 304. Once inside the room 304, the user device 104 may be caused to enter the primary access mode (e.g., by the client application's 152 configuration, in response to a command that causes the communication service 154 to become active, etc.). While operating in the primary access mode, the user device 104 may communicate with the network 130 via the communication service 154 in order to communicate with the application management system 110 and synchronize application items therewith.

Turning now to FIG. 4, an example method 400 for improved quality assurance (QA) is shown. The method 400 may be performed by a computing device, such as the user device 104. At step 402, a first computing device may provide a user interface. For example, the first computing device may be a mobile device, such as the user device 104. The user interface may include a plurality of user interface elements, such as those shown in FIGS. 2A-2I. Each of the user interface elements may be associated with at least one task of a plurality of tasks, such as one or more QA tasks. The plurality of user interface elements (or a portion thereof) may be provided while the first computing device is in a secondary access mode as described above with respect to the user device 104. The first computing device may be caused to enter the secondary access mode in response a command received. The command may be received from a user. The command may cause the first computing device to cause a plurality of communication modules (e.g., the communication service 154) to become inactive. For example, the command may be a command to enter an "Airplane" or similar mode of operation. As another example, the command may be to launch an application associated with the user interface, such as a client application (e.g., the client application 152). While in the secondary access mode, the user may be able to access the client application to make one or more changes to any of a plurality of measurement values (e.g., measurement values 202E-1, 202E-2, 202E-3) associated with at least one task of the plurality of tasks. For example, the user may take one or more measurements, or derive one or more measurements, based on certain aspects of a medical equipment apparatus, such as those shown in the user interface 202D of FIG. 2D.

At step 404, a completion value for the at least one task may be determined. For example, the first computing device may receive at least one user input via at least one user interface element of the plurality of user interface elements. The at least one user input may be received at the user interface after the command is received (e.g., while the first computing device is in the secondary access mode). The completion value may indicate a quantity (e.g., a percentage) of a QA task that has been completed. The at least one user input may be received during a period of non-connectivity. The period of non-connectivity may correspond to a period of time during which the first computing device is not associated with a wireless network (e.g., the network 130). While experiencing the period of non-connectivity, the first computing device may not be in communication with an application management system (e.g., application management system 110). The application management system may store a plurality of application items that relate to the plurality of tasks (e.g., data related to each task).

At step 404, an update message may be sent by the first computing device to a second computing device. The update message may be indicative of the determined completion value. The update message may be sent while the first computing device is experiencing a period of connectivity. The second computing device may be associated with the application management system, such as a server. The period of connectivity may correspond to a period of time during which the first computing device is associated with a wireless network (e.g., the network 130) and in communication with the second computing device. In response to receiving the update message (e.g., an application item—or a portion thereof), the second computing device may cause a database (e.g., any of the databases 140, 142, 146, 144, 148) to be updated to reflect the determined completion value, which may be associated with the medical treatment apparatus.

The first computing device may provide a second user interface. For example, the second user interface may include the plurality of user interface elements. The second user interface may include at least one user interface element of the plurality of user interface elements that is indicative of the completion value for the at least one task (e.g., an updated representation of the first user interface).

Turning now to FIG. 5, an example method 500 for improved quality assurance (QA) is shown. The method 500 may be performed by a computing device, such as the user device 104. At step 502, a first computing device may provide a user interface. For example, the first computing device may be a mobile device, such as the user device 104. The user interface may include a plurality of user interface elements, such as those shown in FIGS. 2A-2I. Each of the user interface elements may be associated with at least one task of a plurality of tasks, such as one or more QA tasks. At least one user interface element of the plurality of user interface elements may not accept user input. For example, the at least one user interface element may be grayed out or not visible.

At step 504, the first computing device may cause a plurality of communication modules (e.g., the communication service 154) to become inactive. The first computing device may cause the plurality of communication modules to become inactive in response to receiving a command. The command may be received from a user. For example, the command may be a command to enter an "Airplane" or similar mode of operation. As another example, the command may be to launch an application associated with the user interface, such as a client application (e.g., the client application 152). The command may cause the computing device to enter a secondary access mode.

At step 506, the first computing device may provide a second user interface. The first computing device may provide the second user interface in response to the plurality of communication modules being inactive. The second user interface may include the plurality of user interface elements; however, the at least one user interface element may now accept user input. The second user interface may be provided while the first computing device is in the secondary access mode as described above with respect to the user device 104. While in the secondary access mode, the user may be able to access the client application to make one or more changes to any of a plurality of measurement values (e.g., measurement values 202E-1, 202E-2, 202E-3) associated with at least one task of the plurality of tasks. For example, the user may take one or more measurements, or derive one or more measurements, based on certain aspects of a medical equipment apparatus, such as those shown in the user interface 202D of FIG. 2D.

At step 508, a completion value for the at least one task may be determined. For example, the first computing device may receive at least one user input via at least one user interface element of the plurality of user interface elements. The at least one user input may be received at the user interface after the command is received (e.g., while the first computing device is in the secondary access mode). The completion value may indicate a quantity (e.g., a percentage) of a QA task that has been completed. The at least one user input may be received during a period of non-connectivity. The period of non-connectivity may correspond to a period of time during which the first computing device is not associated with a wireless network (e.g., the network 130). While experiencing the period of non-connectivity, the first computing device may not be in communication with an application management system (e.g., application management system 110). The application management system may store a plurality of application items that relate to the plurality of tasks (e.g., data related to each task).

An update message may be generated and sent by the first computing device to a second computing device. The update message may be indicative of the determined completion value. The update message may be sent while the first computing device is experiencing a period of connectivity. The second computing device may be associated with the application management system, such as a server. The period of connectivity may correspond to a period of time during which the first computing device is associated with a wireless network (e.g., the network 130) and in communication with the second computing device. In response to receiving the update message (e.g., an application item—or a portion thereof), the second computing device may cause a database (e.g., any of the databases 140, 142, 146, 144, 148) to be updated to reflect the determined completion value, which may be associated with the medical treatment apparatus.

The first computing device may provide a third user interface. For example, the third user interface may include the plurality of user interface elements. The third user interface may include at least one user interface element of the plurality of user interface elements that is indicative of the completion value for the at least one task (e.g., an updated representation of the first and/or second user interface).

Figure 6:
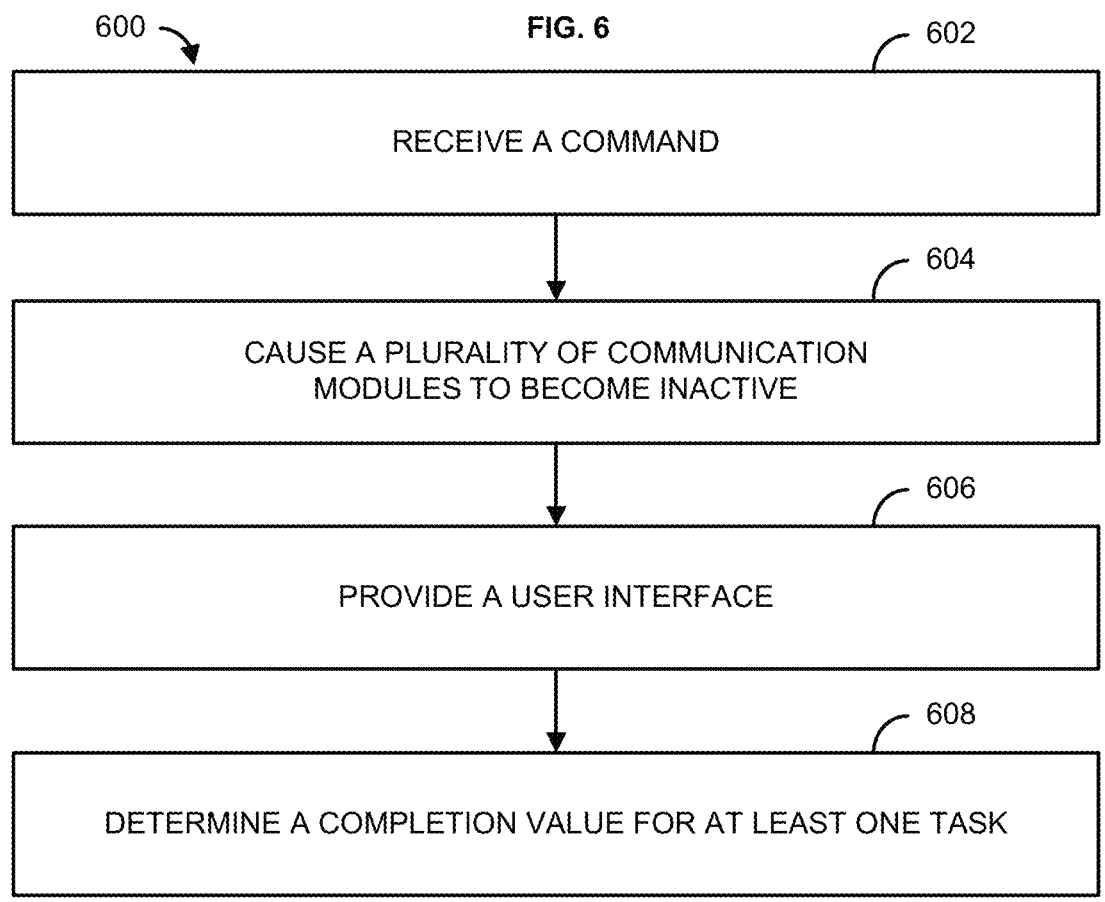
FIG. 6 shows a flowchart of an example method.

Turning now to FIG. 6, an example method 600 for improved quality assurance (QA) is shown. The method 600 may be performed by a computing device, such as the user device 104. At step 602, a first computing device may receive a request. The request may be received from a user. For example, the request may be to enter an "Airplane" or similar mode of operation. As another example, the request may be to launch an application, such as a client application (e.g., the client application 152). The application may be associated with a user interface. The request may cause the first computing device to enter a secondary access mode. At step 604, the first computing device may cause a plurality of communication modules (e.g., the communication service 154) to become inactive. The first computing device may cause the plurality of communication modules to become inactive in response to receiving the request.

At step 606, the first computing device may provide the user interface. For example, the first computing device may be a mobile device, such as the user device 104. The user interface may include a plurality of user interface elements, such as those shown in FIGS. 2A-2I. Each of the user interface elements may be associated with at least one task of a plurality of tasks, such as one or more QA tasks. The first computing device may provide the user interface in response to the plurality of communication modules being inactive. The user interface may be provided while the first computing device is in the secondary access mode as described above with respect to the user device 104. While in the secondary access mode, the user may be able to access the client application to make one or more changes to any of a plurality of measurement values (e.g., measurement values 202E-1, 202E-2, 202E-3) associated with at least one task of the plurality of tasks. For example, the user may take one or more measurements, or derive one or more measurements, based on certain aspects of a medical equipment apparatus, such as those shown in the user interface 202D of FIG. 2D.

At step 608, a completion value for at least one task of the plurality of tasks may be determined. For example, the first computing device may receive at least one user input via at least one user interface element of the plurality of user interface elements. The at least one user input may be received at the user interface after the request is received (e.g., while the first computing device is in the secondary access mode). The completion value may indicate a quantity (e.g., a percentage) of a QA task that has been completed. The at least one user input may be received during a period of non-connectivity. The period of non-connectivity may correspond to a period of time during which the first computing device is not associated with a wireless network (e.g., the network 130). While experiencing the period of non-connectivity, the first computing device may not be in communication with an application management system (e.g., application management system 110). The application management system may store a plurality of application items that relate to the plurality of tasks (e.g., data related to each task).

An update message may be generated and sent by the first computing device to a second computing device. The update message may be indicative of the determined completion value. The update message may be sent while the first computing device is experiencing a period of connectivity. The second computing device may be associated with the application management system, such as a server. The period of connectivity may correspond to a period of time during which the first computing device is associated with a wireless network (e.g., the network 130) and in communication with the second computing device. In response to receiving the update message (e.g., an application item—or a portion thereof), the second computing device may cause a database (e.g., any of the databases 140, 142, 146, 144, 148) to be updated to reflect the determined completion value, which may be associated with the medical treatment apparatus.

The first computing device may provide a second user interface. For example, the second user interface may include the plurality of user interface elements. The second user interface may include at least one user interface element of the plurality of user interface elements that is indicative of the completion value for the at least one task (e.g., an updated representation of the first and/or second user interface).

Figure 7:
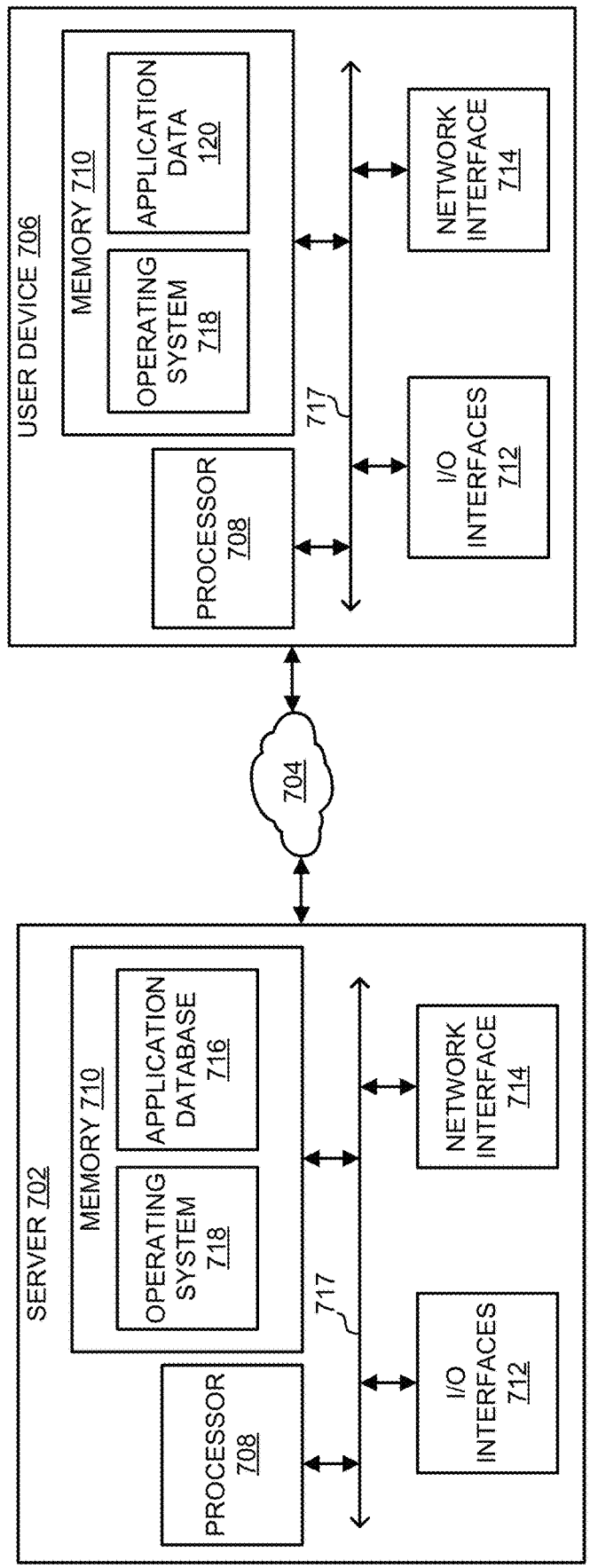
FIG. 7 shows a block diagram of an example system.

Turning now to FIG. 7, a block diagram of an example system 700 for improved quality assurance (QA) is shown. The system 700 may include one or more of the devices/entities shown in FIGS. 1A and 1B with respect to the system 100. For example, the system 700 may include the user device 706 (e.g., the user device 104) and a server 702 (e.g., the application management system 110). The server 702 may include one or more computers each configured to store one or more of a database 716, an operating system 718, and/or the like. The server 702 may be a computer that, in terms of hardware architecture, may each include a processor 708, a memory 710, an input/output (I/O) interface 712, and/or a network interface 714. These may be communicatively coupled via a local interface 717. The local interface 717 may be one or more buses or other wired or wireless connections, as is known in the art. The local interface 717 may have additional elements, which are omitted for simplicity, such as controllers, buffers (caches), drivers, repeaters, and/or receivers, to enable communications. Further, the local interface 717 may include address, control, and/or data connections to enable appropriate communications among the aforementioned components.

Each processor 708 may be a hardware device for executing software, such as software stored in the corresponding memory 710. Each processor 708 may be any custom-made or commercially available processor, a central processing unit (CPU), an auxiliary processor among several processors associated with the server 702 and the user device 706, a semiconductor-based microprocessor (in the form of a microchip or chip set), and/or generally any device for executing software instructions. When the server 702 and/or the user device 706 are in operation, each processor 708 may be configured to execute software stored within the corresponding memory 710, to communicate data to and from the corresponding memory 710, and to generally control operations of the server 702 and/or the user device 706 pursuant to the software.

The I/O interfaces 712 may be used to receive user input from and/or for providing system output to one or more devices or components. User input may be provided via, for example, a keyboard and/or a mouse. System output may be provided via a display device and a printer (not shown). The I/O interfaces 712 may include, for example, a serial port, a parallel port, a Small Computer System Interface (SCSI), an IR interface, an RF interface, a universal serial bus (USB) interface, and/or the like.

The network interfaces 1714 may be used to transmit and receive from an external device, such as the server 702 or the user device 706 on the network 704. The network interfaces 714 may include, for example, a 10BaseT Ethernet Adaptor, a 100BaseT Ethernet Adaptor, a LAN PHY Ethernet Adaptor, a Token Ring Adaptor, a wireless network adapter (e.g., WiFi), or any other suitable network interface device. The network interfaces 714 may include address, control, and/or data connections to enable appropriate communications on the network 704.

The memory 710 may include any one or combination of volatile memory elements (e.g., random access memory (RAM, such as DRAM, SRAM, SDRAM, etc.)) and non-volatile memory elements (e.g., ROM, hard drive, tape, CDROM, DVDROM, etc.). Moreover, the memory system 710 may incorporate electronic, magnetic, optical, and/or other types of storage media. Note that the memory system 710 may have a distributed architecture, where various components are situated remote from one another, but may be accessed by the processor 708.

The software stored the in memory 710 may include one or more software programs, each of which may include an ordered listing of executable instructions for implementing logical functions. For example, as shown in FIG. 7, the software in the memory 710 of the server 702 may include the application database 716 and the operating system (O/S)

718. As also shown in FIG. 7, the software in the memory 710 of the user device 706 may include the application data 720 and the operating system (O/S) 718. Each operating system 718 may control execution of other computer programs. Each operating system 718 may provide scheduling, input-output control, file and data management, memory management, and/or communication control and related services.

While specific configurations have been described, it is not intended that the scope be limited to the particular configurations set forth, as the configurations herein are intended in all respects to be possible configurations rather than restrictive. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
    causing, by an application stored on a first computing device, the first computing device to output a user interface of the application during a period of non-connectivity for the first computing device, wherein the user interface comprises a plurality of user interface elements each associated with at least one task of a plurality of tasks to be completed at a medical treatment apparatus, wherein the user interface is output with: a pre-determined nominal value, a stored measurement value, and a stored differential value associated with a first task of the plurality of tasks, and wherein the stored differential value is based on a difference between the pre-determined nominal value and the stored measurement value;
    receiving, by the application during the period of non-connectivity, via at least one user interface element of the plurality of user interface elements, an edit to the stored measurement value associated with the first task, wherein the edit to the stored measurement value comprises a current measurement value that replaces the stored measurement value, and wherein the pre-determined nominal value is inaccessible for editing via the user interface;
    generating, by the application during the period of non-connectivity, and based on the current measurement value and the pre-determined nominal value, an updated differential value that replaces the stored differential value, wherein the updated differential value is output via the user interface with the pre-determined nominal value and the current measurement value, wherein the current measurement value is indicative of at least a partial completion of the first task at the medical treatment apparatus, and wherein the first task is associated with a stored numerical completion value that was stored at the first computing device and a second computing device prior to the period of non-connectivity;
    determining, by the application during the period of non-connectivity, and based on the edit to the stored measurement value comprising the current measurement value that replaces the stored measurement value, an updated numerical completion value for the first task, wherein the updated numerical completion value is stored at the first computing device during the period of non-connectivity; and
    causing, by the application, the first computing device to send, to the second computing device during a period of connectivity for the first computing device, an update message indicative of the updated numerical completion value for the first task, wherein the update message causes the second computing device to replace the stored numerical completion value with the updated numerical completion value.

2. The method of claim 1, wherein the first computing device is a mobile device, and wherein the period of non-connectivity comprises a period of time during which the mobile device is not associated with a wireless network.

3. The method of claim 1, wherein the second computing device is a server, and wherein the period of connectivity comprises a period of time during which the first computing device is in communication with the server via at least one wireless network.

4. The method of claim 1, wherein the second computing device is a server, and wherein the server causes a database associated with a medical treatment apparatus to be updated based on the update message sent by the first computing device.

5. The method of claim 1, further comprising:
    causing, by the application, the first computing device to output an updated user interface comprising the plurality of user interface elements, wherein the updated user interface is indicative of the updated numerical completion value for the first task.

6. The method of claim 1, further comprising:
    receiving, by the first computing device, from the application, a command associated with a plurality of communication modules; and
    causing, based on the command, the plurality of communication modules to become inactive, wherein the edit to the stored measurement value is received after the command is received.

7. The method of claim 1, further comprising:
    receiving, by the first computing device, from the application, a command to launch an application associated with the user interface; and
    causing, based on the command, a plurality of communication modules to become inactive, wherein the edit to the stored measurement value is received after the command is received.

8. A method comprising:
    causing, by an application stored on a first computing device, the first computing device to output a first user interface of the application, wherein the first user interface comprises a plurality of user interface elements, and wherein the application causes at least one user interface element of the plurality of user interface elements to not accept user input, wherein each of the plurality of user interface elements is associated with at least one task of a plurality of tasks to be completed at a medical treatment apparatus, wherein the first user interface is output with: a pre-determined nominal value, a stored measurement value, and a stored differential value associated with a first task of the plurality of tasks, and wherein the stored differential value is based on a difference between the pre-determined nominal value and the stored measurement value;

causing, by the first computing device, based on a command from the application received at the first computing device, a plurality of communication modules of the first computing device to become inactive;

causing, by the application, based on the plurality of communication modules being inactive, the first computing device to output a second user interface of the application, wherein the second user interface comprises the plurality of user interface elements, and wherein the application causes the at least one user interface element to accept user input based on the plurality of communication modules being inactive;

receiving, by the application via the at least one user interface element, an edit to the stored measurement value associated with the first task, wherein the edit to the stored measurement value comprises a current measurement value that replaces the stored measurement value, wherein the pre-determined nominal value is inaccessible for editing via the user interface, wherein the first task is associated with a stored numerical completion value that was stored at the first computing device prior to the plurality of communication modules becoming inactive; and determining, by the application, based on the edit to the stored measurement value comprising the current measurement value that replaces the stored measurement value, and based on the plurality of communication modules being inactive, an updated numerical completion value for the first task, wherein the current measurement value is indicative of at least a partial completion of the first task at the medical treatment apparatus, and wherein the updated numerical completion value is stored at the first computing device while the plurality of communication modules are inactive.

9. The method of claim 8, further comprising:
generating, based on the plurality of communication modules being inactive, an update message indicative of the updated numerical completion value for the first task.

10. The method of claim 9, further comprising:
sending, to a second computing device during a period of connectivity, the update message.

11. The method of claim 10, wherein the period of connectivity comprises a period of time during which the plurality of communication modules are active.

12. The method of claim 10, wherein the second computing device is a server, and wherein the server causes a database associated with the medical treatment apparatus to be updated based on the update message.

13. The method of claim 8, further comprising:
causing, by the application, the first computing device to output a third user interface comprising the plurality of user interface elements, wherein at least one user interface element of the plurality of user interface elements is indicative of the updated numerical completion value for the first task.

14. The method of claim 8, wherein the command comprises one or more of a user input received at the second user interface or a request to launch the application.

15. A method comprising:
receiving, at a first computing device, a request to launch an application stored on the first computing device;

causing, by the application, based on the request, a plurality of communication modules of the first computing device to become inactive;

causing, by the application, based on the plurality of communication modules being inactive, the first computing device to output a user interface of the application, wherein the user interface comprises a plurality of user interface elements, wherein each of the plurality of user interface elements is associated with at least one task of a plurality of tasks to be completed at a medical treatment apparatus, wherein the user interface is output with; a pre-determined nominal value, a stored measurement value, and a stored differential value associated with a first task of the plurality of tasks, and wherein the stored differential value is based on a difference between the pre-determined nominal value and the stored measurement value;

receiving, by the application via at least one user interface element of the plurality of user interface elements, an edit to the stored measurement value associated with the first task, wherein the edit to the stored measurement value comprises a current measurement value that replaces the stored measurement value, wherein the pre-determined nominal value is inaccessible for editing via the user interface, wherein the plurality of communication modules are inactive when the edit to the stored measurement value is received, and wherein the first task is associated with a stored numerical completion value that was stored at the first computing device prior to the plurality of communication modules becoming inactive; and determining, by the application, based on the edit to the stored measurement value comprising the current measurement value that replaces the stored measurement value, and based on the plurality of communication modules being inactive, an updated numerical completion value for the first task, wherein the current measurement value is indicative of at least a partial completion of the first task at the medical treatment apparatus, and wherein the updated numerical completion value is stored at the first computing device while the plurality of communication modules are inactive.

16. The method of claim 15, further comprising:
generating, based on the plurality of communication modules being inactive, an update message indicative of the updated numerical completion value for the first task.

17. The method of claim 16, further comprising:
sending, to a second computing device during a period of connectivity, the update message.

18. The method of claim 17, wherein the period of connectivity comprises a period of time during which the plurality of communication modules are active.

19. The method of claim 17, wherein the second computing device is a server, and wherein the server causes a database associated with the medical treatment apparatus to be updated based on the update message.

20. The method of claim 15, further comprising:
providing, by the first computing device, a second user interface comprising the plurality of user interface elements, wherein at least one user interface element of the plurality of user interface elements is indicative of the updated numerical completion value for the first task.

* * * * *